(12) United States Patent
Neet

(10) Patent No.: US 6,862,797 B2
(45) Date of Patent: Mar. 8, 2005

(54) AUTOMOTIVE ALTERNATOR STATOR ASSEMBLY WITH RECTANGULAR CONTINUOUS WIRE

(75) Inventor: Kirk E. Neet, Saline, MI (US)

(73) Assignee: Viston Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/848,909

(22) Filed: May 19, 2004

(65) Prior Publication Data

US 2004/0212268 A1 Oct. 28, 2004

Related U.S. Application Data

(60) Division of application No. 10/265,529, filed on Oct. 7, 2002, now Pat. No. 6,759,779, which is a continuation-in-part of application No. 10/056,890, filed on Jan. 24, 2002, now Pat. No. 6,750,581.

(51) Int. Cl.[7] .................. H02K 15/02; H02K 15/12; H02K 15/14; H02K 15/16

(52) U.S. Cl. ................. 29/596; 29/598; 29/605; 29/606; 310/180; 310/201; 310/208

(58) Field of Search ............... 310/179, 180, 310/201, 206, 207, 208; 29/596, 597, 598, 605, 606, 609

(56) References Cited

U.S. PATENT DOCUMENTS

| | | |
|---|---|---|
| 3,566,171 A | 2/1971 | Tichy et al. |
| 3,634,708 A | 1/1972 | Fisher et al. |
| 4,115,915 A | 9/1978 | Godfrey |
| 4,197,475 A | 4/1980 | Ban et al. |
| 4,451,749 A | 5/1984 | Kanayama et al. |
| 4,617,725 A | 10/1986 | Holter et al. |
| 5,343,105 A | 8/1994 | Sakabe et al. |
| 5,444,321 A | 8/1995 | Honda et al. |
| 5,449,962 A | 9/1995 | Shichijyo et al. |
| 5,519,266 A | 5/1996 | Chitayat |
| 5,539,265 A | 7/1996 | Harris et al. |
| 5,926,940 A * | 7/1999 | Toh et al. ............ 29/596 |
| 5,936,326 A | 8/1999 | Umeda et al. |
| 5,955,804 A | 9/1999 | Kusase et al. |
| 5,955,810 A | 9/1999 | Umeda et al. |
| 5,962,943 A | 10/1999 | Shervington |
| 5,965,965 A | 10/1999 | Umeda et al. |
| 5,986,375 A | 11/1999 | Umeda et al. |
| 5,994,802 A | 11/1999 | Shichijyo et al. |
| 5,998,903 A | 12/1999 | Umeda et al. |
| 6,011,332 A | 1/2000 | Umeda et al. |
| 6,037,695 A | 3/2000 | Kanazawa et al. |
| 6,051,906 A | 4/2000 | Umeda et al. |
| 6,059,969 A | 5/2000 | Mizutani |
| 6,078,116 A | 6/2000 | Shiga et al. |
| 6,091,169 A | 7/2000 | Umeda et al. |
| 6,097,130 A | 8/2000 | Umeda et al. |
| 6,124,660 A | 9/2000 | Umeda et al. |
| 6,137,201 A | 10/2000 | Umeda et al. |
| 6,137,202 A | 10/2000 | Holmes et al. |
| 6,138,343 A * | 10/2000 | Hill et al. ............ 29/605 |
| 6,147,430 A | 11/2000 | Kusase et al. |
| 6,147,432 A | 11/2000 | Kusase et al. |
| 6,166,461 A | 12/2000 | Kusase et al. |
| 6,177,747 B1 | 1/2001 | Maeda et al. |
| 6,181,043 B1 | 1/2001 | Kusase et al. |

(List continued on next page.)

FOREIGN PATENT DOCUMENTS

| | | |
|---|---|---|
| EP | 1 134 872 A2 | 9/2001 |
| EP | 1 109 289 A3 | 8/2002 |
| JP | 55120114 | 9/1980 |
| JP | 56083911 | 10/1980 |
| JP | 58192447 | 11/1983 |

*Primary Examiner*—Tran Nguyen
(74) *Attorney, Agent, or Firm*—Brinks Hofer Gilson & Lione

(57) ABSTRACT

A method of forming a stator core assembly for an electric machine includes: providing two electrical conductors designated as conductor A and conductor B and winding the conductors into the winding slots.

16 Claims, 9 Drawing Sheets

U.S. PATENT DOCUMENTS

| | | |
|---|---|---|
| 6,181,045 B1 | 1/2001 | Umeda et al. |
| 6,201,332 B1 | 3/2001 | Umeda et al. |
| 6,204,586 B1 | 3/2001 | Umeda et al. |
| 6,208,060 B1 | 3/2001 | Kusase et al. |
| 6,211,594 B1 | 4/2001 | Umeda et al. |
| 6,222,295 B1 | 4/2001 | Umeda et al. |
| 6,242,836 B1 | 6/2001 | Ishida et al. |
| 6,252,326 B1 | 6/2001 | Umeda et al. |
| 6,268,678 B1 | 7/2001 | Asao et al. |
| 6,281,614 B1 | 8/2001 | Hill |
| 6,285,105 B1 | 9/2001 | Asao et al. |
| 6,291,918 B1 | 9/2001 | Umeda et al. |
| 6,333,573 B1 | 12/2001 | Nakamura |
| 6,335,583 B1 | 1/2002 | Kusase et al. |
| 6,337,530 B1 | 1/2002 | Nakamura et al. |
| 6,687,974 B1 * | 2/2004 | Asao et al. .................... 29/596 |
| 2001/0011852 A1 | 8/2001 | Nakamura et al. |
| 2001/0024071 A1 | 9/2001 | Yoshida et al. |
| 2001/0026109 A1 | 10/2001 | Higashino et al. |
| 2001/0030487 A1 | 10/2001 | Higashino et al. |
| 2001/0040415 A1 | 11/2001 | Asao et al. |
| 2001/0040416 A1 | 11/2001 | Nakamura et al. |
| 2001/0040418 A1 | 11/2001 | Higashino et al. |
| 2003/0071534 A1 * | 4/2003 | Kreuzer et al. ............. 310/216 |
| 2003/0121139 A1 * | 7/2003 | Katou et al. .................. 29/596 |
| 2003/0132680 A1 | 7/2003 | Nakamura et al. |
| 2004/0006866 A1 * | 1/2004 | Kato et al. .................... 29/596 |

* cited by examiner

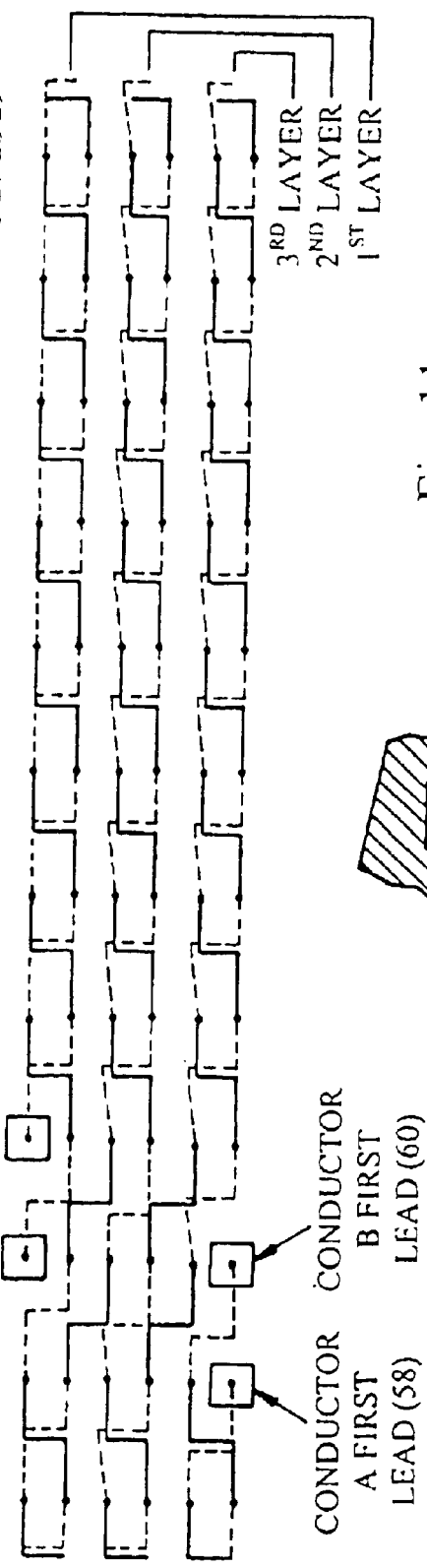
Fig. 11
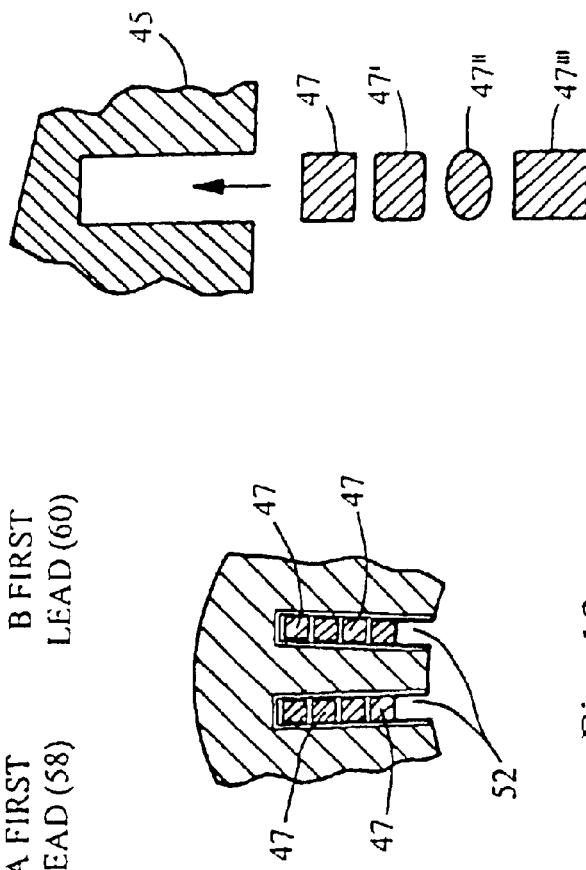
Fig. 12
Fig. 13

AUTOMOTIVE ALTERNATOR STATOR ASSEMBLY WITH RECTANGULAR CONTINUOUS WIRE

CROSS-REFERENCE TO RELATED APPLICATIONS

The present invention is a divisional application corresponding to U.S., patent application Ser. No. 10/265,529 filed on Oct. 7, 2002 now U.S. Pat. No. 6,759,779, entitled "Automotive Alternator Stator Assembly With Continuous Wire", Which is a continuation-in-part application corresponding to U.S. patent application Ser. No. 10/056,890 filed on Jan. 24, 2002 now U.S. Pat. No. 6,750,581, entitled "Automobile Alternator Stator Assembly With Rectangular Continuous Wire".

FIELD OF INVENTION

The invention relates to an automotive electrical alternator, and particularly to an alternator having an improved stator winding configuration.

BACKGROUND OF THE INVENTION

This invention is related to an electrical alternator, of a type particularly adapted for use in motor vehicle applications including passenger cars and light trucks. These devices are typically mechanically driven using a drive belt wrapped on a pulley connected to the crankshaft of the vehicle's internal combustion engine. The belt drives a pulley on the alternator which rotates an internal rotor assembly to generate alternating current (AC) electrical power. This alternating current electrical power is rectified to direct current (DC) and supplied to the motor vehicle's electrical bus and storage battery.

While alternators have been in use in motor vehicles for many decades, today's demands on motor vehicle design, cost, and performance have placed increasing emphasis on the design of more efficient alternators. Today's motor vehicles feature a dramatic increase in the number of electrical on-board systems and accessories. Such electrical devices include interior and exterior lighting, climate control systems; and increasingly sophisticated power train control systems, vehicle stability systems, traction control systems, and anti-lock brake systems. Vehicle audio and telematics systems place further demands on the vehicle's electrical system. Still further challenges in terms of the output capacity of the motor vehicle's electrical alternators will come with the widespread adoption of electrically assisted power steering and electric vehicle braking systems. Compounding these design challenges is the fact that the vehicle's electrical system demands vary widely, irrespective of the engine operating speed which drives the alternator and changes through various driving conditions.

In addition to the challenges of providing high electrical output for the vehicle electrical alternator, further constraints include the desire to minimize the size of the alternator with respect to under hood packaging limitations, and its mass which relates to the vehicle's fuel mileage.

In addition to the need of providing higher electrical output, designers of these devices further strive to provide high efficiency in the conversion of mechanical power delivered by the engine driven belt to electrical power output. Such efficiency translates directly into higher overall thermal efficiency of the motor vehicle and thus into fuel economy gains. And finally, as is the case with all components for mass-produced motor vehicles, cost remains a factor in the competitive offerings of such components to original equipment manufacturers.

Enhanced efficiency of the alternator can be provided through various design approaches. The alternator uses a rotating rotor assembly, which creates a rotating alternating polarity magnetic field. This rotating alternating polarity magnetic field is exposed to an annular stator core assembly which closely surrounds the rotor assembly. Electrical conductor windings are embedded within the stator core assembly. A number of design challenges are presented with respect to the design and manufacturing of the stator core assembly which includes a stator core and the windings. The stator core has a series of radially projecting slots. Some alternator designs employ conventional wire conductors having a round cross sectional shape laced into the stator core winding slots. These round cross-sectional wires are nested against other turns of wire in the slots. The use of such round wire produces air spaces between adjacent turns of wire. This air space represents unused space in the cross section of the stator core. Electrical resistance through a solid conductor is related to its cross sectional area. Consequently, the air space between adjacent turns of a round wire stator represents inefficiency since that space is not being used to carry electrical current through the stator windings.

One improved design of stator core assembly uses stator windings formed of rectangular or square cross sectional wire. Such wire can be laced into the stator core winding slots in a very densely packed configuration. This allows larger cross sectional areas to be provided for the conductors, thus lowering the conductor's resistance. Reducing the stator core winding resistance improves efficiency. Such rectangular wire core designs are said to improve "slot space utilization".

Although rectangular cross section wire for the stator core assembly provides the previously noted benefits, its use produces a number of design challenges. Rectangular cross section wire is more difficult to form and wind into the stator winding slots, since it is necessary to align the cross section to the slot dimensions.

Since the stator conductors are laced from the two axial ends of the stator core, they are looped at their ends to pass into the next appropriate winding slot. It is desirable to reduce the length or height of these end loops as a means of reducing the total length and therefore the internal resistance of the conductors.

Designers of stator assemblies further attempt to reduce or eliminate the need for providing electrical conductor terminations and connections in the stator assembly. The necessity to physically connect conductors in the stator core assembly adversely impacts cost and complexity of the manufacturing process. An advantageous design of an alternator stator assembly would enable the stator assembly to be readily adapted for various types of electrical connections and number of phases of produced alternating current. Automotive electrical alternators are often manufactured in a three-phase configuration with the phases connected in the familiar delta or Y connections. As mentioned previously, the alternating current output is later rectified and conditioned by downstream electrical devices.

SUMMARY OF THE INVENTION

The automotive alternator stator core assembly in accordance with this invention addresses each of the design and manufacturing goals previously noted. The alternator stator core assembly in accordance with this invention utilizes a unique winding pattern particularly advantageously used with rectangular cross section stator winding conductors. The design features high slot space utilization, eliminates the necessity for providing internal welds or other connections for the conductors, and features low-end loop height. The design is further highly flexible, enabling the change to a number of electrical turns by winding more or less layers, or by changing the conductor connection between series or parallel.

Additional benefits and advantages of the present invention will become apparent to those skilled in the art to which the present invention relates from the subsequent description of the preferred embodiment and the appended claims, taken in conjunction with the accompanying drawings.

BRIEF DESCRIPTION OF THE DRAWINGS

FIG. 11 is a winding pattern schematic similar to FIG. 7 showing multiple layers of stator windings in a fully formed stator core assembly;

FIG. 12 illustrates alternative cross sectional shapes for the winding of this invention; and FIG. 13 illustrates how the windings fit closely within the slots.

DESCRIPTION OF THE PREFERRED EMBODIMENTS

Figure 1:
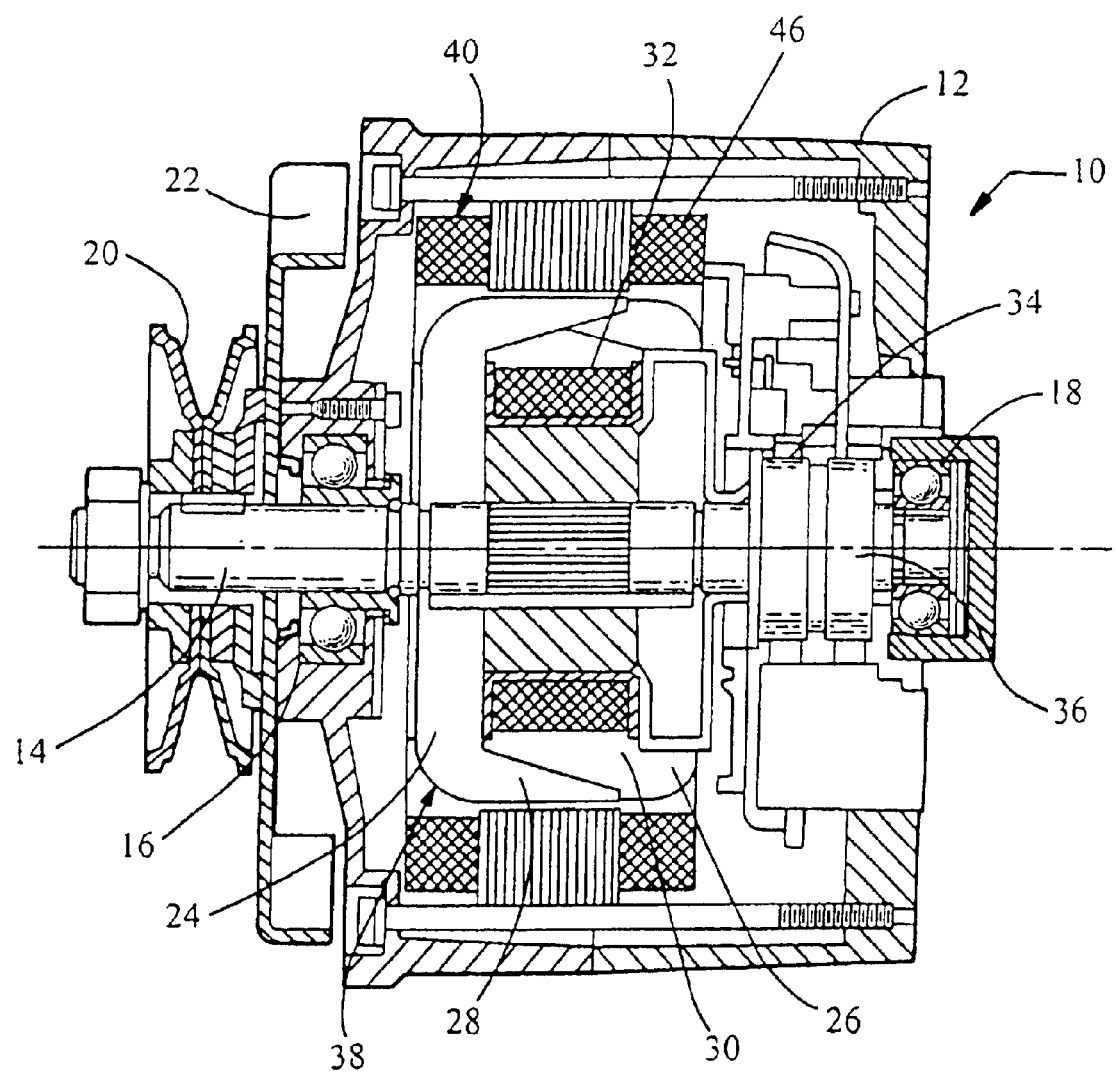
FIG. 1 is a cross sectional view of a typical prior art electrical alternator.
Figure 2:
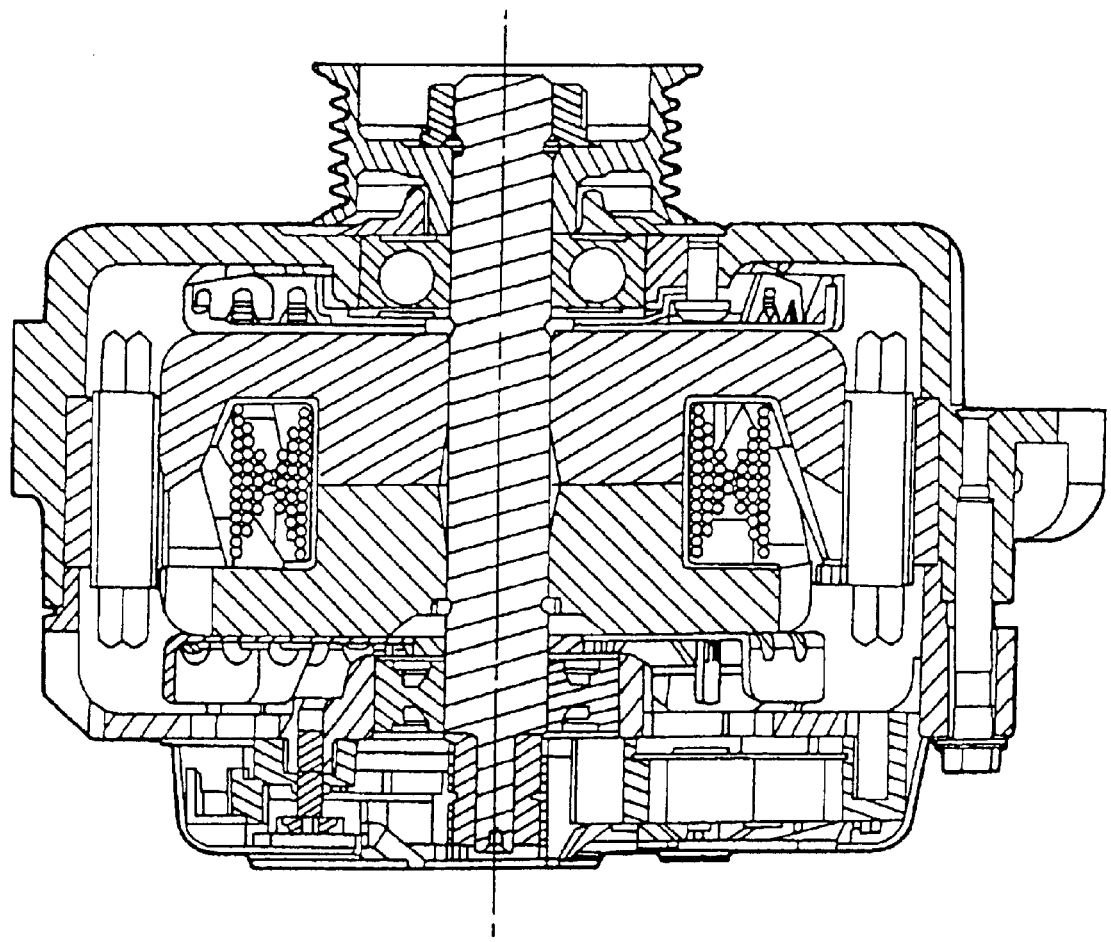
FIG. 2 is a cross sectional view of an electrical alternator of the present invention.

In order to provide a framework for a further detailed description of the preferred embodiments of this invention, FIG. 1 is presented illustrating a prior art electrical alternator configuration. That figure illustrates electrical alternator 10 enclosed with housing 12. Alternator rotor shaft 14 is supported by rolling element bearings 16 and 18. Belt driven pulley 20 is fastened to the protruding front end of rotor shaft 14. Fan 22 rotates with shaft 14 and provides cooling airflow for removing heat from alternator 10. Front and rear alternator poles pieces 24 and 26, respectively, rotate with shaft 14 and have extending claw fingers 28 and 30, respectively. Fingers 28 and 30 interlace to create the well known "claw pole" rotor configuration. Although the "claw pole" rotor is described, one skilled in the art will recognize that the described stator design can be used in conjunction with other types of rotors, such as; permanent magnet non claw pole, permanent magnet claw pole, salient field wound and induction type rotors. Excitation winding 32 is carried within the cavity formed between pole pieces 24 and 26. A DC signal is applied to excitation winding 32 through a pair of slip rings 34 and 36, and associated brushes.

Rotor assembly 38 which includes pole pieces 24 and 26, winding 32, and slip rings 34 and 36, produces an alternating polarity magnetic field which rotates with rotation of the rotor assembly. Although a DC excitation signal is applied to slip rings 34 and 36, the interlacing of pole pieces 24 and 26 creates an alternating polarity magnetic field as presented to the windings 46 of stator core assembly 40 located radially around rotor assembly 38. The movement of the alternating polarity magnetic field presented by rotor assembly 38 across the core windings 46 generates electricity in a well-known manner.

Electrical energy produced by electrical alternator 10 generated within core assembly 40 is directed to rectifying diodes (not shown) and perhaps further filtering and power conditioning devices before being connected with the vehicle's electric distribution bus. Control systems, also known as voltage regulators, are used to apply an appropriate level of DC voltage to excitation windings 32 to generate the desired RMS value of the outputted alternating current from alternator 10, which can be in single phase or multi-phase form, depending on the design and winding pattern of windings 46.

Figure 3:
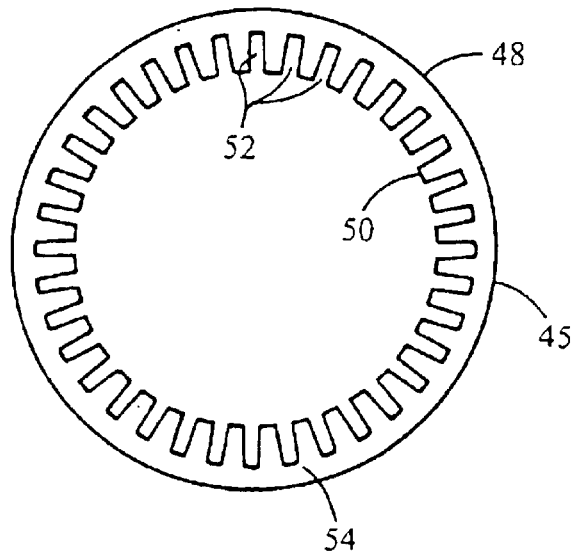
FIG. 3 is an end view of a stator core of the stator core assembly in accordance with this invention.
Figure 4:
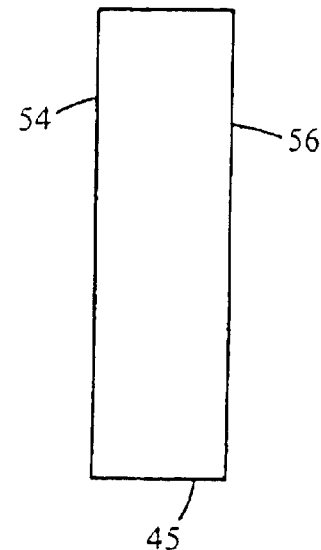
FIG. 4 is a side view of the stator core shown in FIG. 1.

Now with specific reference to FIGS. 1 through 13, specific details of stator core assembly 41 in accordance with this invention will be described. Stator core assembly 41 principally comprises stator core 45 and conductor windings 47. FIGS. 3 and 4 illustrate stator core 45 before windings 47 are installed. As illustrated in FIG. 3, stator core 45 is an annular metallic component defining outside diameter 48, inside diameter 50 with radially projecting winding slots 52. Winding slots 52 open at inside diameter 50, but bottom in the radially outer direction before reaching outside diameter 58. Winding slots 52 are provided at equal angular increment positions around stator core 45. With reference to FIG. 4, stator core 45 defines planar end faces, further defined as a lead side 54 and a non-lead side 56.

Now with reference to FIG. 4, a detailed view of a series of adjacent winding slots 52 of stator core 45 is shown. Windings 47 are comprised of rectangular cross section electrical conductors. Reference to rectangular is, of course, intended to include square cross sectional shapes. Preferably, the width of the conductors, including any insulation on the conductors is such that the conductors fit closely within the winding slots 52, including any insulation on the slots. These windings 47 are loaded into slots 52 to receive the windings in a densely packed configuration, with adjacent winding turns overlaid on one another in the radial direction as illustrated in FIG. 4.

Now with particular reference to FIGS. 5 through 13, the winding pattern which comprises a primary feature of this invention will be described in detail. To aid in a further explanation of the winding pattern, the following variables will be used:

n=the number of phases of the alternator (AC phases of produced power);

m=number of winding slots 52 in the stator core 45;

L=number of layers of windings, including the radially outer layer (L≧1);

K=designation of individual layers where K=1 for the outer layer, K=2 for the first middle layer, etc.

Figure 5:
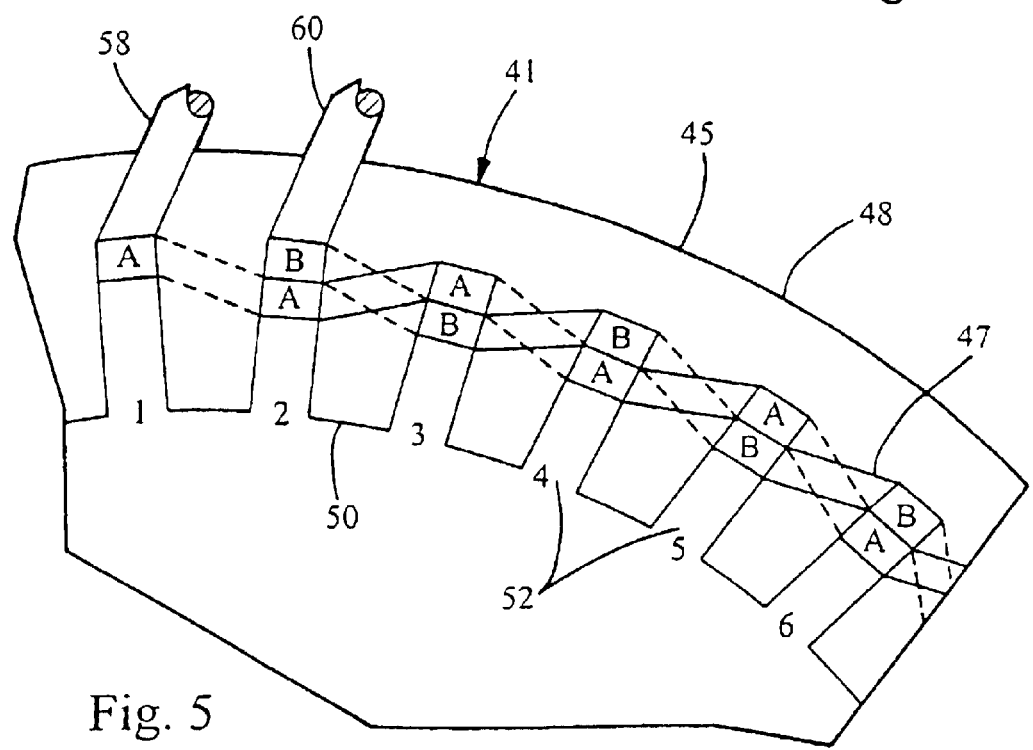
FIG. 5 is a partial end view of a stator core similar to FIG. 2 but showing one layer of the stator windings laced into the stator core winding slots.

The windings 47 are comprised of at least two individual conductors which are each continuous wires (i.e. not formed by mechanically joining separate lengths of conductor). Typically, two conductors would be used for each phase, and therefore, a single-phase alternator could have two conductors, a three-phase alternator having six conductors, etc. With reference to FIG. 5, the two conductors are designated A and B, and they are aligned in one radial row in each winding slot 52. In each winding slot 52, this row extends radially from the "bottom" of each winding slot 52 near the stator outside diameter 48, to an inner position toward stator side diameter 50. As mentioned previously, a three-phase configuration is commonly used but six-phase designs may also be provided. However, for a simplified illustration, FIG. 5 shows a winding pattern of windings 47 in which a single-phase electrical output is provided.

Formation of the outer layer of the windings 46 will now be described with specific reference to FIG. 5. So as to reduce the complexity of the following description, winding slots 52 will be identified by their respective consecutive slot number, 1 through m. Furthermore, the portion of conductors A and B, which are interleaved into two adjacent radial portions of the winding slots for one substantial revolution around the core, will be regarded as comprising a single layer.

The first lead 58 of conductor A is located on the lead side 54 of stator core 44, and is positioned in the outermost portion of winding slot number 1. From slot number 1, conductor A extends from the opposite side of the core (i.e. non-lead side 56), then conductor A shifts radially inward and circumferentially toward slot number n+1, (which in this case is slot number 2). In slot number n+1 (or slot number 2), the first lead 60 of conductor B is located on the lead side 54 and in the outermost portion of the slot, while conductor A is located in the second outermost portion of the slot. From slot number n+1 (or slot number 2), conductor A shifts radially outward and circumferentially toward slot number 2n+1 (slot number 3 in this example) on the lead side 54 of the core 45, while conductor B shifts radially inward and circumferentially toward slot number 2n+1 (slot number 3 in this example) on the non-lead side 56 of the core. In slot number 2n+1 (slot number 3), conductor B is located on the second outermost position, while conductor A is located on the outermost position of the slot. Conductors A and B alternate these outer and second outermost positions in the slots and alternate in forming end loops at the lead and non-lead sides of the core 54 and 56 between the slots 52. This pattern is repeated around the core 45 until conductor A reaches slot number m+1−n and conductor B reaches slot number 1. At this point, a first outer layer K=1 of windings 47 is formed in stator core 45.

From slot number m+1−n, and for layer K=2 and additional layers through K=L, conductor A shifts radially inward and circumferentially toward slot number 1 on the lead side 54 of the core 45 where it is located in the 2K−1 outermost portion of the slot. From slot number 1, conductor B shifts radially inward and circumferentially towards slot number n+1 (or slot number 2 of the example) on the lead side 54 where it is located in the 2K−1 outermost portion of the slot. From slot number 1, conductor A shifts inward and circumferentially towards slot number n+1 (or slot number 2) on the non-lead side 56 where it is located in the 2K outermost portion of the slot. The conductors A and B continue in the same direction exactly like the first outer layer except that the slot positions are the 2K−1 outermost positions and the 2K outermost positions.

After completing L total layers, conductor A ends at the innermost position of slot number m+1−n, where it becomes a second lead 64 on the lead side 54, and conductor B ends at the innermost portion of slot number 1 where it becomes a second lead 66 extending from the lead side 54. The two conductors A and B are then connected to each other in parallel for an L turn stator, or in series for a 2L turn stator.

In the case where, for example, a three-phase stator core assembly 41 is provided, the multiple phases of the stator are connected to each other in the wye or ring (delta) formation. Also, in the case of such a three-phase alternator, the conductors A and B would be placed into every third slot. Two other pairs of conductors would comprise the other two phases and would be placed in slots 52 as described previously.

The windings 47 of this invention are produced by winding the outer layer K=1, the desired number of middle layers through K=L, and the end terminations. The windings 47, may be formed by pressing wire stock to form straight slot segments 53 (shown for one portion of winding 47 in a slot 52 in FIG. 6) which will be located in the winding slots 52, and end loop segments 62 that connect the slot segments. Referring to FIG. 7, the two conductors A and B, after being formed to proper shape, are wound together in a linear fashion outside the core with respective slot segment alternating in a front position and a rear position. These two conductors A and B alternate their respective front and rear positions except in the "radial shift" areas between the layers. In these areas, one of the conductors is wound with three consecutive slot segments placed in the front position, while the other conductor is wound with three consecutive slot segments in the back position. The four end loop segments 62 (lead side 54 and non-lead side 56) between these three consecutive areas are all shifted in the same direction, this results in an inward radial shift after the conductors A and B are inserted into the core 45. The windings 47 are interlaced together with the conductors of the other phases as shown schematically in FIG. 9 and then inserted into core slots 52 beginning with the first lead 58 in slot number 1. The windings 47 are then inserted in one direction (clockwise or counterclockwise) such that the second layer lays directly radially inward of the first layer.

Figure 6:
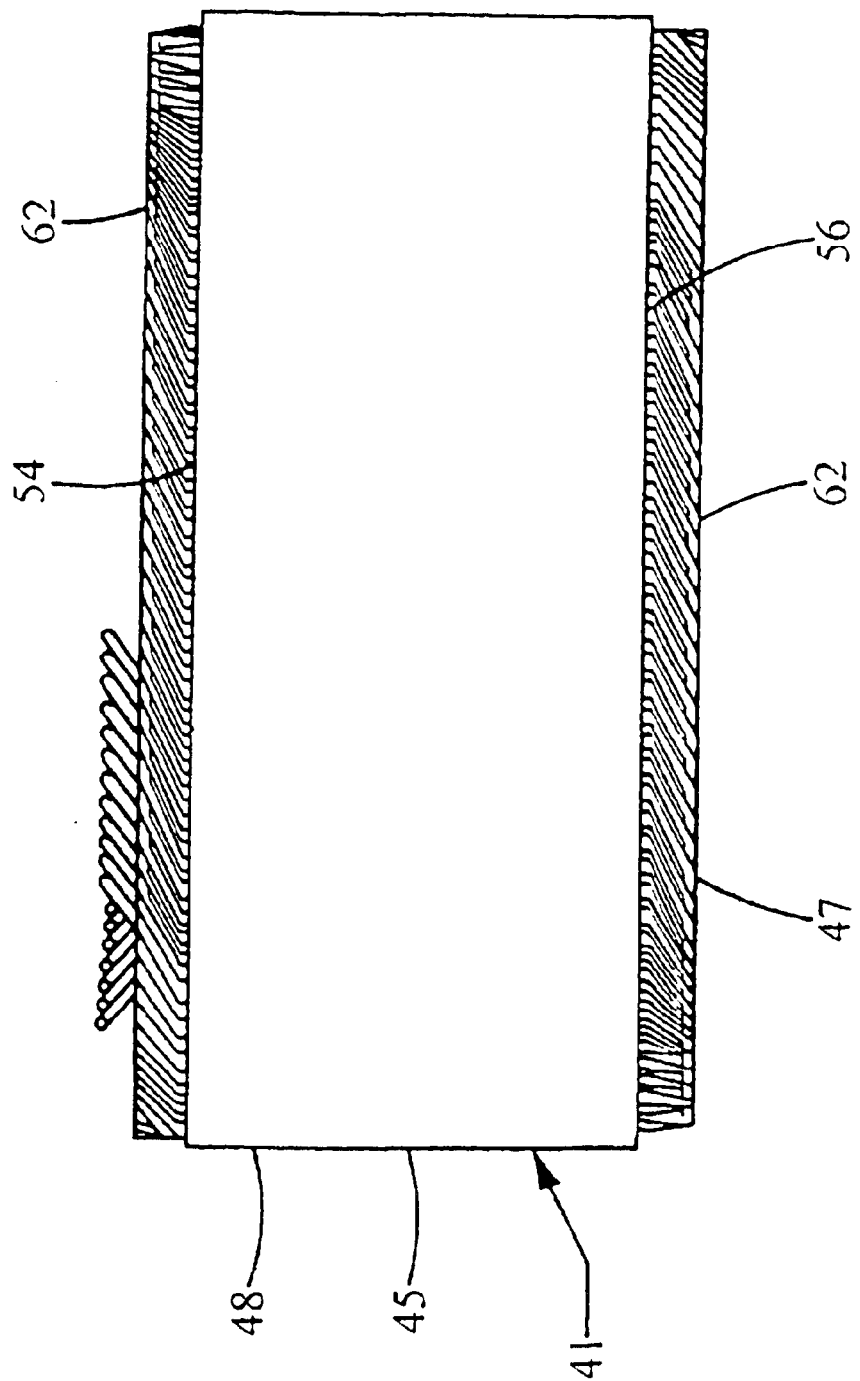
FIG. 6 is a side view of a completed stator core assembly in accordance with this invention.
Figure 7:
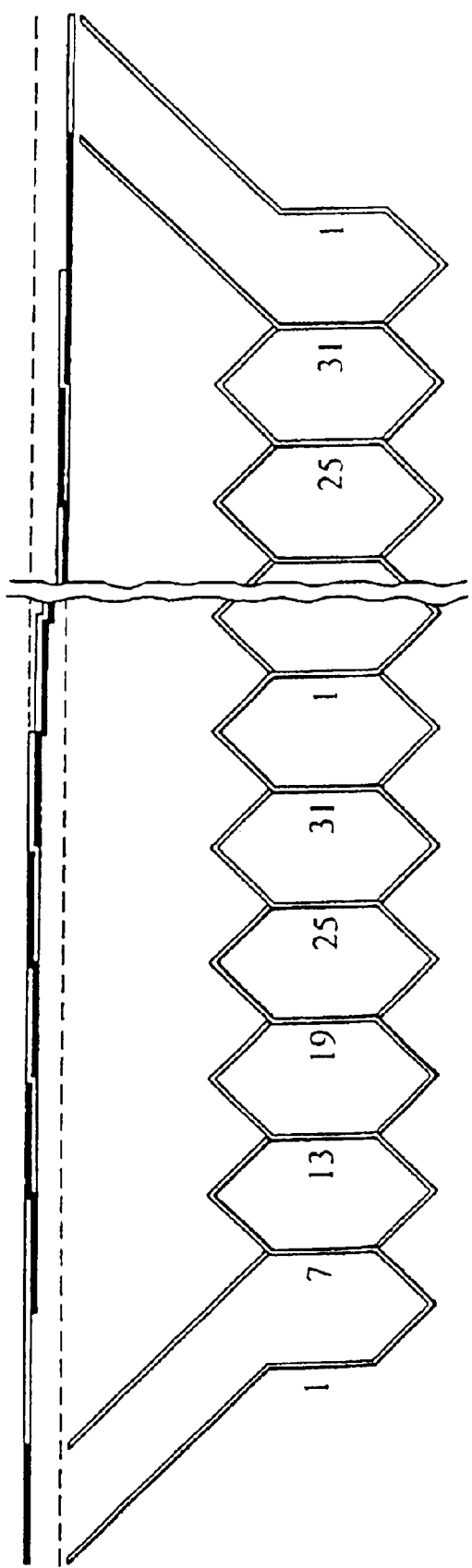
FIG. 7 is a schematic view illustrating one phase of a woven winding.
Figure 8:
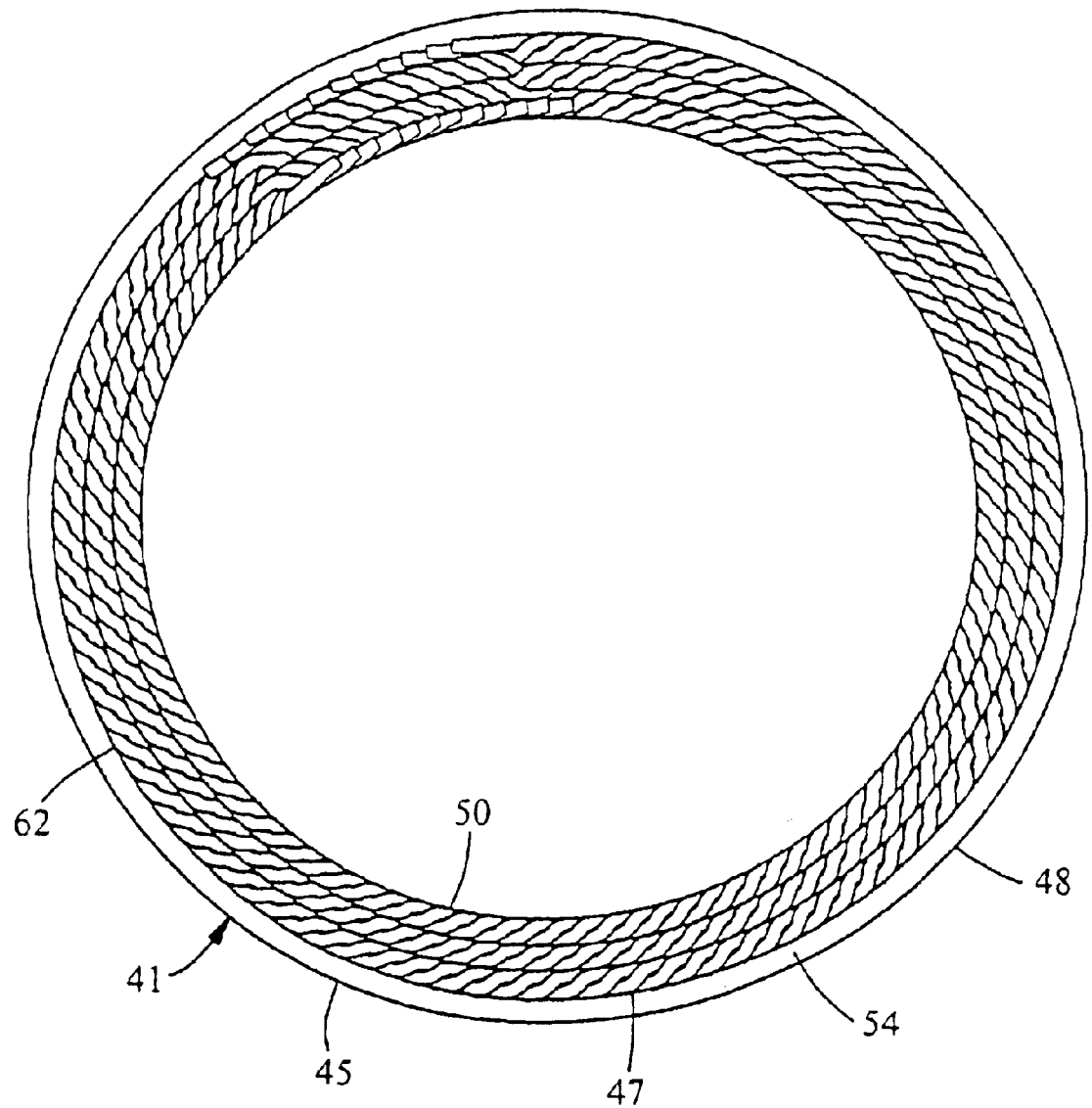
FIG. 8 is an end view of the completed stator core assembly in accordance with this invention.
Figure 9:
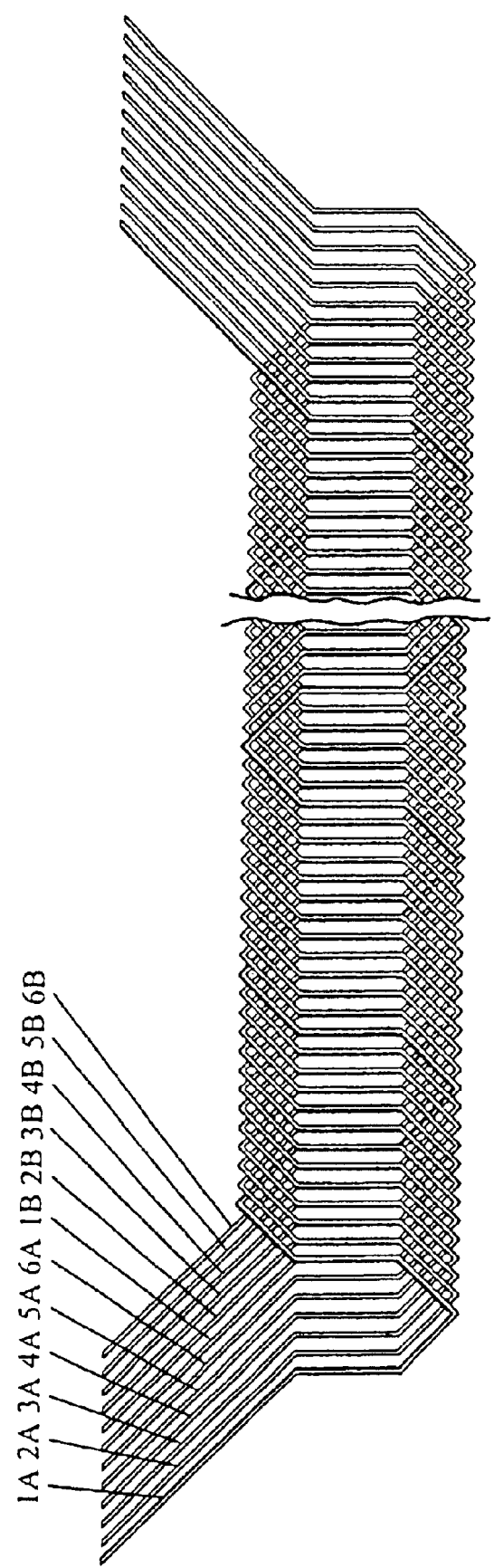
FIG. 9 is a schematic view illustrating a six-phase woven winding.

With the configuration of winding for a representative six-phase stator core assembly 40, the configuration shown in FIGS. 6 and 8 is produced. These figures illustrate the densely packed configuration of the end loop segments 62 of windings 47 which are the loops formed on the lead side 54 and non-lead side 56 ends of the stator core. As is evident, these end loops are twisted at the ends and are densely packed and can be formed to have a very low height. This configuration is shown schematically in FIG. 9. The twist is shown as the end loops axially extend away from the core, circumferentially shift to a first position, shift radially outward to a second position, lower axially back toward the core and circumferentially forward, behind the adjacent phase conductors and enter the next predetermined slot.

FIGS. 6 and 8 also illustrate a six-phase configuration where the number of winding layers (L) is equal to three and the layers are aligned radially.

Figure 10:
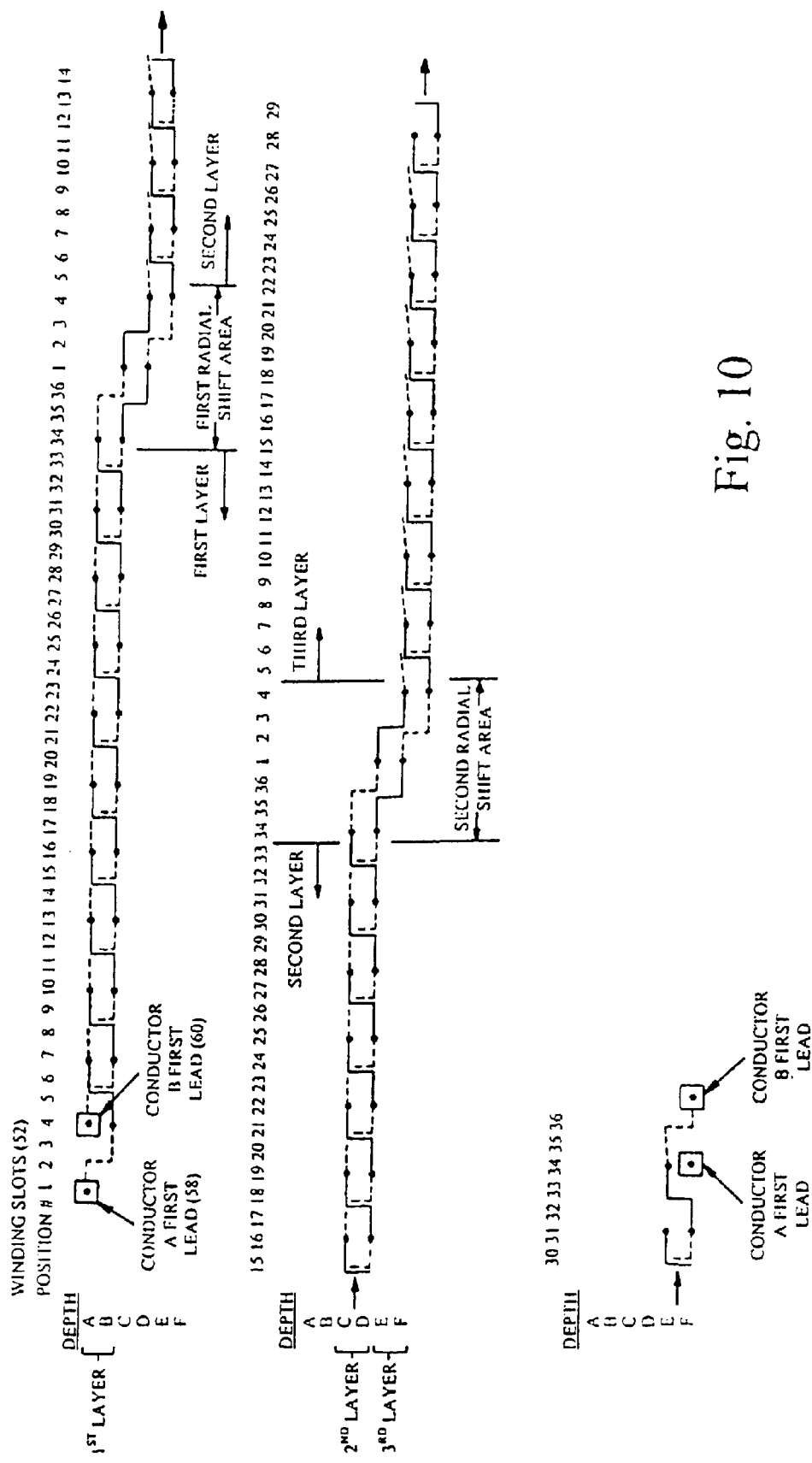
FIG. 10 is a schematic view illustrating one phase of the winding pattern for the stator core assembly in accordance with this invention, prior to insertion into the core.

FIGS. 10 and 11 are schematic diagrams, which represent another approach of illustrating the winding pattern provided for stator core assembly 40. In FIG. 10 one phase of the stator winding pattern is represented prior to insertion into the core, while in FIG. 11, the winding and stator core 45 are represented in a "flattened" configuration, with adjacent winding slots 52 represented by position numbers 1 through 36 which numbers repeat three times, representing three layers of conductors. The depth positions A through F represent winding positions starting at the radially outermost position A and moving toward the inside diameter 50 at depth position F. Depth positions A and B comprise a first layer, depth positions C and D comprise the second layer, and depth positions E and F comprise the third layer. Both FIGS. 10 and 11 illustrate one phase of a three-phase (n=3) configuration with the number of slots 52 equal to 36 (m=36) and having three layers (K).

FIGS. 10 and 11 illustrate schematically the pattern of the windings 47 when looking at the stator core 45 at the lead side 54 for a representative three-phase core assembly 40. The solid lines represent end loop segments 62 of the conductors on the lead side 54, whereas the dashed lines represent the end loop segments 62 on the opposite non-lead side 56 of the core 45. As is evident from FIG. 7, starting at position 1, conductor A, at the outermost depth position A, moves to depth position B at slot 4, since conductor B is in the depth position A of slot 4. These conductors are then loaded into every third slot thereafter and alternate in their positions between depth positions A and B. As shown in FIG. 10, once the position 36 is reached, the conductors A and B begin to form a second layer, represented by depth positions C and D. This continues around the stator core 45 until again position 36 is reached, at which case the third layer begins occupying depth positions E and F. The "radial shift areas" shown in FIG. 10 represent the points at which a new layer overlays a previously formed layer.

FIG. 11 is similar to FIG. 10 but illustrates the winding after insertion into the core in a "flattened" state.

FIG. 12 illustrates alternative cross sectional shapes for windings 47. In FIG. 12, this rectangular shape is designated by reference number 47. 47' represents a rectangular cross section with radiused corners. 47" represents an ellipse shaped cross section and 47''' represents a square cross sectional shape. FIG. 13 illustrates how the windings 47 fit closely within the slots 52, aligned in one radial row.

While the above description constitutes the preferred embodiment of the present invention, it will be appreciated that the invention is susceptible to modification, variation and change without departing from the proper scope and fair meaning of the accompanying claims.

I claim:

1. A method of forming a stator core assembly for an electric machine of the type having a rotor assembly and a stator assembly, the stator assembly of the type having an annular core defining an outside diameter, an inside diameter, and a plurality of radially projecting winding slots opening to the inside diameter but terminating short of the outside diameter, the core further defining a lead side and an opposite non-lead side, the method comprising the steps of:
   a) providing two electrical conductors designated as conductor A and conductor B,
   b) winding the conductors into the winding slots where:
      n=number of phases of the stator core assembly,
      m=number of the winding slots in the stator core, with the winding slots numbered 1 through m,
      L=number of radial layers of the conductors A and B in the winding slots, wherein L=1 is defined as a layer where conductors A and B are interleaved in the first and second outermost portions of the slots, L=2 is defined as a layer where conductor A and B are interleaved in the third and fourth outermost portions of the slots, and L=K is defined as a layer K where conductors A and B are interleaved in the 2K and 2K−1 outermost portions of the slots wherein K=1 for layer 1 which is the outermost layer and K=L being the innermost layer, by the following winding steps:
   c) the winding including placing a first lead of conductor A into the slot number 1 with the conductor A first lead extending from the stator lead side end,
   d) the winding including placing a first lead of the conductor B into slot number n+1 with the conductor B first lead extending from the stator lead side end,
   e) the winding including shifting the conductor A to the slot number n+1 thereby forming an end loop on the non-lead side end and lying in the slot number n+1 radially shifted inwardly from the conductor B and located in the second outermost radial portion of the slot,
   f) the winding including shifting the conductor A to the slot number 2n+1 and lying in slot number 2n+1 radially shifted outward to lie in the outermost radial portion of the slot,
   g) the winding including shifting the conductor B to the slot number 2n+1 thereby forming an end loop on the non-lead side and lying in the slot number 2n+1 radially shifted inwardly from the conductor A and located in the second outermost radial portion of the slot,
   h) the winding including shifting the conductor B to the slot number 3n+1 and lying in slot number 3n+1 radially shifted outward to lie in the outermost radial portion of the slot,
   i) repeating winding steps e) through h) for every n+1 slot, through slot number m+1−n for conductor A, and slot number 1 for conductor B, thereby forming a first layer K=1,
   j) the winding including shifting the conductor A from slot M+1−n radially inward into the third outermost portion of slot number 1 and shifting the conductor B from slot number 1 radially inward into the third outermost portion of slot number n+1,
   k) repeating steps e) through j), thereby forming additional layers through L wherein the conductors A and B of each layer K will lie in 2K−1 and 2K outermost portions of the slot for e) through I) and in 2K+1 outermost portion of the slot for j) and k), and deleting step j) for the innermost layer K=L.

2. The method of forming a stator core assembly for an electric machine according to claim 1, further including:
   completing the current phase winding by extending conductor A from the radial innermost portion of slot m+1−n on the lead side end, thereby defining a conductor A second lead, and extending conductor B from the radial innermost portion of slot 1 on the lead side, thereby defining a conductor B second lead.

3. The method of forming a stator core assembly for an electric machine according to claim 2, further including:
   completing the stator winding by repeating winding steps c) through l) for each phase 2 through n, wherein each phase is shifted by one slot from the previous phase.

4. A method of forming a stator core assembly for an electric machine according to claim 1, wherein the conductors are of the type having a substantially rectangular cross-sectional shape.

5. A method of forming a stator core assembly for an electric machine according to claim 1 wherein the conductors are of the type having a substantially square cross-sectional shape.

6. A method of forming a stator core assembly for an electric machine according to claim 1 wherein the provided conductors, including any insulation on the conductors, have a width of a dimension to be closely received by the winding slots including any insulation on the slots.

7. A method of forming a stator core assembly for an electric machine according to claim 1 wherein n=3.

8. A method of forming a stator core assembly for an electric machine according to claim 1 wherein n=6.

9. A method of forming a stator core assembly for an electric machine according to claim 1 wherein L=3.

10. A method of forming a stator core assembly for an electric machine according to claim 1 wherein the two conductors A and B are series connected.

11. A method of forming a stator core assembly for an electric machine according to claim 1 wherein the two conductors A and B are parallel connected.

12. A method of forming a stator core assembly for an electric machine according to claim 1 wherein the two conductors A and B are formed to a shape to be placed into the winding slots before being placed into the winding slots.

13. A method of forming a stator core assembly for an electric machine according to claim 1 wherein the two conductors A and B are interleaved prior to the step of being placed into the winding slots.

14. A method of forming a stator core assembly for an electric machine according to claim 1 wherein the two conductors A and B are interleaved by alternating the front and rear positions in a predetermined pitch of slots of the two conductors, excluding three consecutive slots in each radial shift area, prior to the step of being placed into the winding slots, wherein at the radial shift areas, one conductor is placed in front of the other conductor for three consecutive slots.

15. A method of forming a stator core assembly for an electric machine according to claim 13 wherein the layers of the conductors are wound in a linear fashion such that layer 2 is aligned and continuous with layer 1, layer 3 is aligned and continuous with layer 2, and layer K+1 is aligned and continuous with layer K, wherein the layers are placed into the slots beginning with layer number 1 toward a rear portion of the slots and is inserted in one rotational direction such that layer 2 lays radially inward of layer 1, layer 3 lays radially inward of layer 2, and layer K+1 lays radially inward of layer K.

16. A method of forming a stator core assembly for an electric machine according to claim 14 wherein the end loops of conductors A and B of each phase are twisted to interleave conductors A and B of all the phases prior to insertion into the core.

* * * * *